United States Patent [19]

Porcher

[11] Patent Number: 5,561,375
[45] Date of Patent: Oct. 1, 1996

[54] VARIABLE-RELUCTANCE ABSOLUTE-ANGULAR-POSITION SENSOR OF THE INDUCTIVE TYPE HAVING A STATOR WITH NON-CONSTANT AIR GAP THICKNESS

[75] Inventor: Yves Porcher, Le Plessis Bouchard, France

[73] Assignee: Societe D'Applications Generales D'Electricite et de Mecanique Sagem, Paris, France

[21] Appl. No.: 410,791

[22] Filed: Mar. 27, 1995

[30] Foreign Application Priority Data

Mar. 28, 1994 [FR] France ................................. 94 03589

[51] Int. Cl.⁶ ............................. G01D 5/22; G01B 7/30; G01B 7/14
[52] U.S. Cl. ............................ 324/207.16; 324/207.22; 324/207.25
[58] Field of Search ..................... 324/207.12, 207.16, 324/207.17, 207.18, 207.19, 207.22, 207.24, 207.25, 173, 174; 340/870.31, 870.35, 870.37

[56] References Cited

FOREIGN PATENT DOCUMENTS

| 0049987 | 4/1982 | European Pat. Off. . |
|---|---|---|
| 0519844 | 12/1992 | European Pat. Off. . |
| 2677757 | 12/1992 | France . |
| 2684180 | 5/1993 | France . |
| 1613848 | 12/1990 | U.S.S.R. ............................ 324/207.25 |

*Primary Examiner*—Walter E. Snow
*Attorney, Agent, or Firm*—Larson and Taylor

[57] ABSTRACT

Variable-reluctance absolute-angular-position sensor including at least one stator member (A). The stator member includes at least one fixed armature (2) made of soft ferromagnetic material, with a central core defining two mutually opposed transverse faces (9, 10) shaped in order to define an air gap (11) of non-constant thickness between them. At least one annular coil (4) surrounds the cores; and at least one rotor member (B) which includes at least one disc (3) extends into the abovementioned air gap and rotates about an axis (X) substantially coaxial with the core. The disc is made of a soft ferromagnetic material or a non-magnetic material which is a good electrical conductor.

9 Claims, 2 Drawing Sheets

VARIABLE-RELUCTANCE ABSOLUTE-ANGULAR-POSITION SENSOR OF THE INDUCTIVE TYPE HAVING A STATOR WITH NON-CONSTANT AIR GAP THICKNESS

The present invention relates in general to the field of absolute-angular-position sensors of the inductive type and, more specifically, it relates to improvements made to those of these sensors which operate according to the following two physical principles:

with variation in reluctance achieved via variable ferromagnetic coupling: the variation in reluctance is, in this case, produced by the movement (insertion or extraction), into or out of an air gap, of an armature made of ferromagnetic material, this armature, on being inserted, facilitating the passage of the magnetic flux in this region;

with variation in reluctance achieved via variable metallic screening: for a magnetic excitation of alternating (for example sinusoidal) waveform, the variation in reluctance is produced, under the same conditions, by an armature made of a non-magnetic metallic material having good electrical conductivity in which eddy currents develop, this armature, on being inserted, opposing the passage of the magnetic flux in this region (hence the name variable screening).

Many constructions of devices are already known which make it possible to provide the function of measuring the absolute angular position; examples of such sensors are given especially in Patent Applications FR 2,677,757 and FR 684,180 in the name of the Applicant Company. However, these sensors have various drawbacks due, especially, either to the construction and/or adjustment complexity, or to the production cost.

The object of the invention is essentially to provide a sensor of novel construction which, while still meeting the various requirements of the art in terms of performance, accuracy, reproducibility and reliability, may allow, by way of its constructional simplicity, a low production cost, and therefore a cost suited to mass production. Such a sensor might, for example, find application as an angular position sensor, replacing the potentiometers used for this purpose which have the major drawback of having a rubbing contact liable to wear.

To these ends, an absolute-angular-position sensor of the inductive type with variation in reluctance, being constructed in accordance with the invention, is essentially characterized in that it comprises:

at least one stator member which includes
at least one fixed armature made of soft ferromagnetic material, with a central core defining two mutually opposing transverse-faces shaped-in order to define an air gap of non-constant thickness between them, and
at least one annular coil surrounding the said core
and at least one rotor member which includes at least one disc extending into the abovementioned air gap and rotating about an axis substantially coaxial with the core, the disc being made of a soft ferromagnetic material or a non-magnetic material which is a good electrical conductor.

In such a device, the rotation of the moving disc varies the overall reluctance of the magnetic circuit as a function of its angular position, and therefore also varies the value of the inductance of the coil. The value of this inductance is therefore representative of the angular position of the disc and of the shaft to which it is fastened. It should be noted that, in this basic structure, the sensor is insensitive to the axial play, and possibly to the radial play in certain arrangements of the disc which may exist between the rotor part and the stator part, this constituting a not-insignificant advantage in terms of operational use.

The non-constant thickness of the air gap, which makes it possible to provide part of the function of the angle sensor, may be provided by two facing surfaces, either or both of which have any shape, both axially and radially, appropriate to the type of output signal desired. However, as regards firstly the shape in the axial direction, two particular shapes would seem to be particularly advantageous:

at least one of the faces defining the air gap is plane and inclined with respect to the plane perpendicular to the axis of rotation of the disc, the height of the air gap thereby varying periodically over one revolution of rotation;

at least one of the faces defining the air gap is made in the form of a step separating two plane surfaces substantially perpendicular to the axis of rotation of the disc, advantageously, in this case, the step extends so as to intersect the axis of rotation of the disc, especially in a substantially diametral manner, so as to simplify the means for processing the signal picked up.

In an embodiment which is preferred by reason of the simplicity of manufacture of the component parts, the two faces defining the air gap have a circular contour in plane projection and the disc is in the form of a circular sector or has a general shape which is approximately that of a circular sector. Still for the same reason and for simplifying the decoding of the signal picked up, it is desirable that the disc possess substantially plane and preferably mutually parallel, principal faces.

In a particularly advantageous practical embodiment, the fixed armature of the stator detector consists of at least one pot having a central core, closed off by a lid, the end face of the core defining the air gap with the face opposite the lid and the coil being housed in the annular housing surrounding the core; or alternatively, as a variant, the fixed armature of the stator detector consists of two pots having a central core, which are placed against each other, at least one end face of one core being set back in order to define the air gap and the coil being housed in the annular housing surrounding the cores.

The ferrite pot or pots constituting the fixed magnetic circuit may be of round shape, which is the most common shape, but this shape is not absolutely necessary:

so-called square-shaped or cross-shaped pots exist. In fact, the external shape of the pot is not of paramount importance, the sole function of the outer edge being to close off the magnetic flux and to return it towards the central cores and towards the air gap between these cores, where the moving armature providing the variation in reluctance lies.

From the structural standpoint, all the parts, in particular the pot or pots and the coil (except the moving disc), belong to those used in the construction of pot-wound induction coils employed in electronics and are therefore conventional, well-known and commonly available components suitable for mass production and of relatively low cost. In particular, the particular configuration (step, inclination) of the end face of at least one of the ferromagnetic cores may, without excessive additional cost, be obtained by reworking the face of a core of a pre-existing pot or alternatively directly during manufacture of the pot.

Information about the angular position may be obtained, for example, by making use, by means of the operation of an associated electronic device, the embodiment of which does not come within the scope of the present invention, of the variation in the time constant of an inductive circuit into which the coil of the sensor is incorporated; the counting of the charging or discharging time of this inductive circuit to a predefined threshold makes it possible to know the value of the inductance and therefore the angular position. This principle furthermore allows digitization of the processing, possible compensations as a function of the environment, and real-time operation by means of a computer managing the system containing this sensor. This mode of application is not limiting and any other principle making use of the variation in inductance may be envisaged.

According to an alternative embodiment mentioned earlier, it is possible to replace the moving magnetic circuit made of soft ferromagnetic material with a moving armature made of a non-magnetic material having a good electrical conductivity; typically, this is a metal disc made of copper, brass or aluminium, or any other equivalent material. In this case, the property of variation in reluctance achieved by insertion of a variable metallic screen into the magnetic circuit is used. This alternative finds an application in cases where the magnetic excitation is at sufficiently high a frequency for the eddy currents developing in the metal disc to perform their screening role. This configuration may have the advantage of constructional simplicity of the moving member and of a lower manufacturing cost.

In some application configurations, it may be found advantageous to use a differential electrical structure enabling the electrical signals coming from the sensor to be used in a different and simpler way. This may depend on the electronic environment employed in order to use this type of sensor. An alternative construction of the sensor described hereinabove allows this type of use: to this end, the fixed armature of the stator detector consists of two pots with a central core which are placed on either side of a ferromagnetic washer and which define, with the latter, two diametrally opposed shaped air gaps, two coils being housed inside the respective pots and two discs, which rotate together and are in angular coincidence, being arranged respectively in the two air gaps. Thus, the two sensors as described are coaxially combined, the fixed magnetic circuits, on the one hand, and the moving magnetic circuits, on the other hand, being linked together in such a way that the respective variations in inductance of the respective cells occur in a predetermined phase relationship (for example in phase or in phase opposition); thus, two electrical circuits are used which may be connected together, either in an electrical assembly of the potentiometric type, the two windings then being placed in series and creating a mid-point, or in an electrical assembly of the measurement-bridge type. In the case of an assembly of the potentiometric type, an appreciable advantage arises, as regards the power supply of such a system, when a specific electronic processing device is not available: a simple standard alternating power supply is then sufficient. In fact, the connecting of the two inductors in series, one of which varies in the opposite direction to the other, means that the overall impedance seen by the power supply remains constant; the sensor is thus supplied at constant current. Under these conditions, the alternating magnetic flux of each cell varies in proportion to the value of its inductance, the sum of the fluxes remaining constant. The alternating signal appearing at the mid-point therefore varies as a function of the angular position of the moving armature. Preferably, this variation is linear in the case where the end of one of the cores has a discontinuity which is in the form of a step or step-shaped or alternatively is sinusoidal in the case where this end is in the form of an inclined plane. The use of such a sensor is therefore also very simple, even in the context of a simplified power supply.

A sensor arranged in accordance with the invention, either in its basic design or in its differential-operation design, makes it possible to obtain a signal whose period corresponds to one revolution or indeed, in a particular construction, to a submultiple of one revolution of rotation of the rotor. For the two preferred variable shapes of the air gap (inclined plane or discontinuity in the form of a step) which are mentioned, the waveform of the alternating signal obtained over one revolution is respectively pseudo-sinusoidal or alternatively quasi-triangular with symmetrical slopes. In the latter case, the signal representing the angular position is theoretically linear over a movement of 180 degrees of the rotor; in practice, and because of the rounded shapes at the vertices, the zone which can be usefully exploited on each slope is of the order of 140 degrees.

BRIEF DESCRIPTION OF DRAWINGS

The invention will be better understood on reading the following description of certain embodiments given solely by way of examples, these being purely for illustrative purposes and being in no way limiting. In this description, reference is made to the appended drawings in which.

In the figures, the same numerical references are used to denote the same parts or members, possibly accompanied by a symbol ' or " in order to distinguish the alternative forms in various embodiments.

Figure 1:
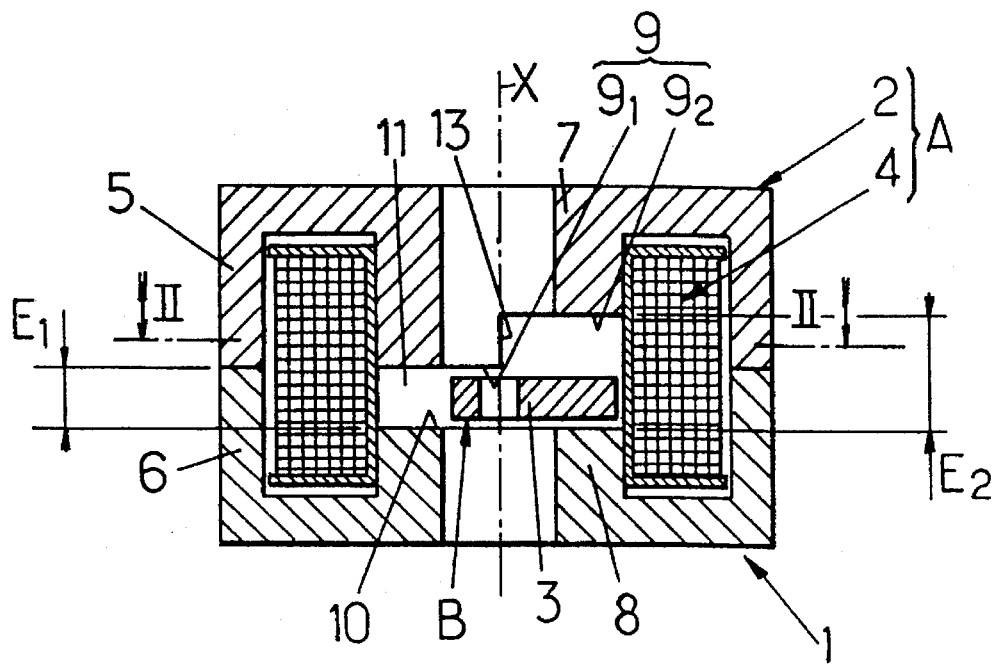
FIG. 1 is a view in diametral section along the line I—I of FIG. 2, of a first embodiment of an absolute-angular-position sensor arranged in accordance with the invention.

A variable-reluctance absolute-angular-position sensor, designated in its entirety by the numerical reference 1, comprises:

at least one stator member A which includes
  at least one fixed magnetic circuit or armature 2 made of soft ferromagnetic material, having two mutually opposing faces 9 and 10 shaped in order to define an air gap 11 of non-constant thickness, and
  at least one annular coil 4 surrounding the said armature 2 provided with the air gap 11 and at least one rotor member B which includes at least one disc 3 extending into the abovementioned air gap 11 and rotating about an axis X coaxial with the abovementioned faces 9 and 10 defining the air gap 11, the disc 3 being made of a soft ferromagnetic material or a non-magnetic material which is a good electrical conductor.

As depicted for the various embodiments illustrated in the Figures, the fixed armature 2 may advantageously consist of a pot or the assembly of two half-pots, made of ferrite, of a type virtually analogous to those commonly available on the market for making inductors in the electronics industry.

Figure 2:
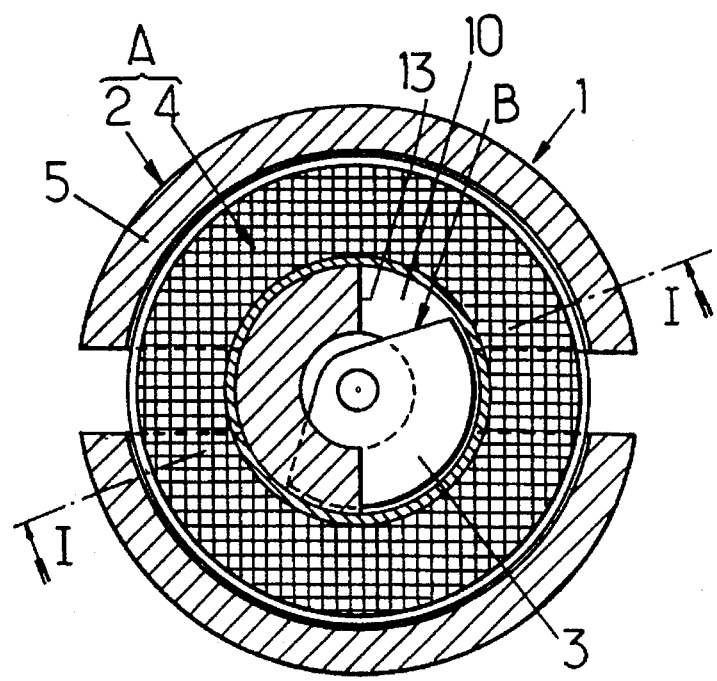
FIG. 2 is a view from above, in section along the line II—II of FIG. 1, showing an embodiment of the shape of the moving armature.

In the embodiment of FIGS. 1 and 2, the fixed magnetic circuit 2 is composed of two half-pots 5 and 6, fastened together, for example by mechanical means, not shown, and made of a soft ferromagnetic material (for example, preferably either made of a material of the soft-ferrite, manganese-zinc or nickel-zinc type or made of compressed iron powder), this material having to provide good magnetic permeability combined with a low production cost. The armature 2 therefore consists of two round half-pots 5 and 6, each having the general shape of an annular cup with a cylindrical tubular outer edge and with a flat bottom, at the centre of which cup stands coaxially a cylindrical central core, centrally hollowed out, respectively 7 and 8; the free end surface 9, 10 of each core 7 and 8 is located substantially beneath the outer peripheral upper edge of each half-pot. The two half-pots 5 and 6 are assembled and fastened together, face to face, bearing mutually on each other by their respective outer edges. The ends 9 and 10 of the central cores 7 and 8 being substantially set back, define between them a central air gap 11, the particular shape of which makes it possible to provide part of the function of the angle sensor which is the subject of the invention.

The particular shape given to the air gap is characterized, as mentioned earlier, in that the air gap 11 posseslyes a non-constant thickness, in other words in that the two faces 9 and 10 of the cores 7 and 8, which define the said air gap, are not simultaneously plane and mutually parallel.

In the embodiment more particularly depicted in FIGS. 1 and 2, the face 10 of the core 8 is plane and substantially perpendicular to the axis X, whereas the face 9 of the core 7 is in the form of a step or step-shaped, with a discontinuity 13, which extends preferably substantially diametrally in order to simplify the shape of the output signal and the decoding of it; this step separates two semicircular zones of the face 9, respectively $9_1$ and $9_2$ which are individually plane and substantially perpendicular to the axis X. The result of this is that the air gap 11 has two semidiscoidally shaped zones of revolution of different thicknesses $E_1$ and $E_2$.

The function of the coil 4 inserted between the half-pots 5 and 6 is to provide the magnetomotive force necessary for the magnetic excitation of the circuit and, moreover, to recover the information about the angular position associated with the variation in its inductance while the disc 3 is rotating in the air gap 11. This coil is made with a predetermined number of turns and is placed in the annular housing defined by the cups in the two half-pots, concentrically with the central cores 7 and 8.

As a variant, the single coil may be replaced with two coils. In this case, the two functions mentioned hereinabove may be distributed between the two coils, one supplying the magnetomotive force and the other, via magnetic coupling with the first coil, supplying the information about the variation in the inductance. This configuration may be advantageous, for example in the case of a sensor with a differential electrical structure, an example of which is given below.

The moving armature 3 is in the form of a flat disc, having substantially parallel principal faces, the general shape of which is that of a disc sector having an axis coaxial with the cores 7 and 8 and having a diameter substantially identical to, or slightly greater than, that of the cores, and which is driven in rotation by an attached means (not depicted) accessible from outside, for example a rotating shaft passing through the central hole of one of the cores. The armature 3 is made of a soft ferromagnetic material, preferably, as for the fixed magnetic circuit 2, either a ferrite or an iron powder; an alternative form intended for relatively high-frequency applications consists of a non-magnetic material having a good electrical conductivity and, in the latter case, the armature 3 performs the variable-screening role by varying the reluctance of the entire magnetic circuit.

The construction which has just been described in relation to FIGS. 1 and 2 makes it possible to obtain an electrical output signal, at the terminals of the coil 4, which increases and decreases linearly in an alternating manner for each revolution of rotation of the disc 3, this signal being an expression of the variation in the inductance in the coil 4. Thus, a value of the inductance is associated with each angular position of the disc 3, and therefore of the rotating shaft fastened to it: detection of this value, by analysing the aforementioned signal, makes it possible to know the angular position of the shaft.

Figure 3:
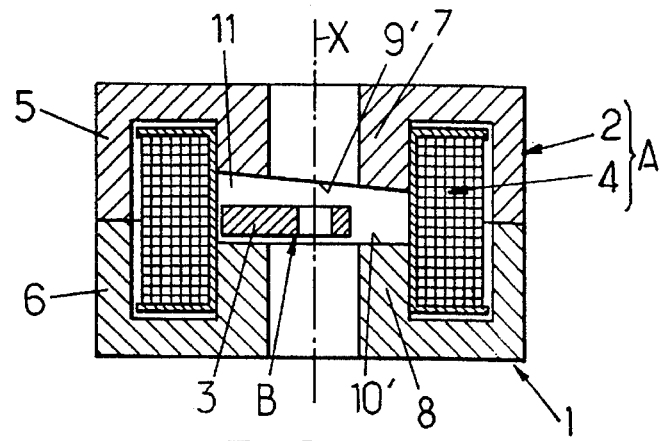
FIG. 3 is a view in diametral section of another embodiment of a sensor in accordance with the invention.

Depicted in FIG. 3 is an alternative embodiment of the sensor in accordance with the invention. This alternative form is characterized in that at least one of the ends 9' and/or 10' of the cores 7, 8 no longer has a discontinuity in the form of a step, but is made in the form of a plane face inclined with respect to the plane perpendicular to the axis X. This particular shape makes it possible to obtain a sinusoidal variation in the value of the inductance of the coil 4, for each revolution of rotation of the disc 3.

Of course, the ends 9 and 10 of the cores may be arranged to have any shape, or any appropriate combination of shapes, which may lead to specific functional variations in the value of the inductance over one revolution or over a fraction of a revolution of rotation of the disc 3 (for example a trapezoidal variation in the value of the inductance).

Figure 4:
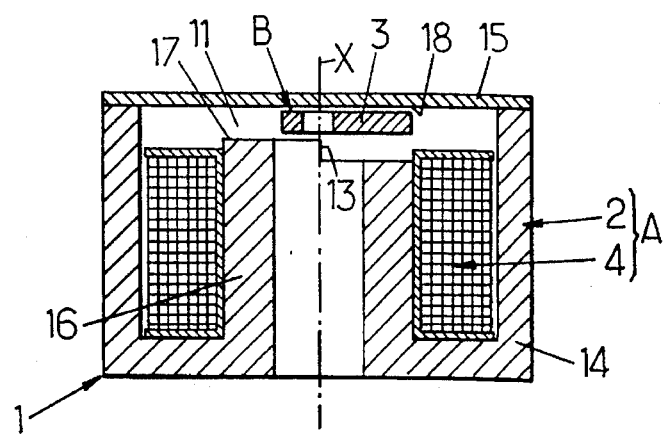
FIG. 4 is a view in diametral section of yet another embodiment of a sensor in accordance with the invention.

FIG. 4 shows yet another embodiment in which the construction of the fixed magnetic circuit 2 makes use not of two ferrite pots placed beside each other face to face, as in the embodiments of FIGS. 1 to 3, but of a single ferrite pot 14 of the same general construction as each of the previous pots 5, 6, but deeper so as to house by itself the coil 4, the return of the flux being provided by a simple ferrite lid 15. The air gap 11 is then defined between the opposing faces, separated from each other, of the core 16 of the pot and of the lid 15. The end face 17 of the core and/or the internal face 18 of the lid are/is then arranged so as to make the air gap 11 have a non-constant thickness. In the embodiment depicted in FIG. 4, the end face 17 of the core has a step 13, according to the same construction as in FIG. 1, it being understood that this step could be provided on the internal face 18 of the lid, or else that the face 17 and/or the face 18 could be inclined as in the embodiment of FIG. 3.

Figure 5:
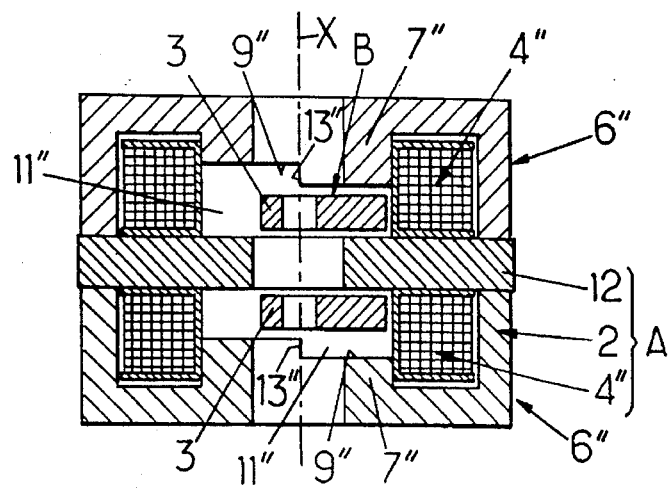
FIG. 5 depicts a view in diametral section of another alternative embodiment of a sensor with two cells joined together in a differential construction.

FIG. 5 depicts a particular embodiment of the sensor for which a differential construction of two basic cells makes it possible to make use of the output signals in a differential electrical form. The mechanical structure is, however, improved so as to reduce the cost compared to simply juxtaposing two cells individually made in accordance with one of the preceding embodiments. Here, two strictly identical pots, fastened to each other face to face, are used, inserting between them a washer 12 of the same material and drilled out at its centre to the same diameter as the holes made in the cores 7". Two air-gap zones 11" are thus defined on either side of the washer 12. The discontinuities 13" in the shape of a step (or the inclined facets in the case of application of this variant) are diametrally opposed.

For each cell, a moving disc-shaped armature, which rotates, is housed in each air gap 11", the two armatures being arranged in angular coincidence and fastened to a member accessible from the outside, for example a rotating shaft, the whole constituting the rotor member moving in rotation, for which it is desired to measure the angular position.

It should be noted that the angular offsets mentioned hereinabove between the step-shaped discontinuities (or the inclined facets) and between the moving armatures are relative, the final result desired having to be such that the variations in the inductances are in phase opposition.

To conclude, each cell includes a coil 4", either a single one as described earlier or a double one as described in the alternative form with two coils, as also mentioned above, this configuration allowing use as a differential transformer.

The embodiment of FIG. 5 constitutes a sensor with an electrical (and mechanical, as for each cell taken separately) differential configuration allowing, in some cases, easier use, although having a cost substantially greater than the basic cell, but less than the cost of two individual cells coupled together.

Needless to say, and as already results, moreover, from the foregoing, the invention is in no way limited to those of its embodiments which have been more particularly envisaged; on the contrary, it encompasses all variants thereof.

I claim:

1. Variable-reluctance absolute-angular-position sensor characterized in that it comprises:

at least one stator member which includes a central axis, at least one fixed armature made of soft ferromagnetic material, with a central core coaxial with the central axis and defining two mutually opposing transverse faces shaped in order to define an air gap of non-constant thickness between them, and at least one annular coil coaxial with the central axis and laterally surrounding the core; and at least one rotor member which includes at least one disc extending into the abovementioned air gap and rotating about the central axis, the disc being made of a soft ferromagnetic material or a non-magnetic material which is a good electrical conductor.

2. Sensor according to claim 1, characterized in that at least one of the faces defining the air gap is plane and inclined with respect to the plane perpendicular to the central axis.

3. Sensor according to claim 1, characterized in that at least one of the faces defining the air gap is made in the form of a step separating two plane surfaces substantially perpendicular to the central axis.

4. Sensor according to claim 3, characterized in that the step extends so as to intersect the central axis in a substantially diametral manner.

5. Sensor according to claim 1, characterized in that the two faces defining the air gap have a circular contour in plane projection and in that the disc has a general shape which is approximately that of a circular sector.

6. Sensor according to claim 1, characterized in that the disc possesses substantially plane principal faces.

7. Sensor according to claim 1, characterized in that the fixed armature of the stator member consists of at least one pot having the central core therein closed off by a lid, the end face of the core defining the air gap with the face opposite the lid and the coil being housed in an annular housing of the pot surrounding the core.

8. Sensor according to claim 1, characterized in that the fixed armature of the stator member consists of two pots having mating positions which define the central core, which are placed against each other, at least one end face of one core being set back in order to define the air gap and the coil being housed in an annular housing of the pots surrounding the cores.

9. Sensor according to claim 1, characterized in that the fixed armature of the stator member consists of two pots with a central core, which pots are placed on either side of a ferromagnetic washer and which define with the washer two diametrally opposed shaped air gaps, two respective coils being housed inside the respective pots and two discs, which rotate together and are in angular coincidence, being arranged respectively in the two air gaps.

* * * * *